(12) United States Patent
Salmanian

(10) Patent No.: US 6,944,125 B1
(45) Date of Patent: Sep. 13, 2005

(54) CALL ADMISSION CONTROL METHOD AND APPARATUS FOR CELLULAR SYSTEMS

(75) Inventor: Mazda Salmanian, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/383,629

(22) Filed: Aug. 26, 1999

(51) Int. Cl.[7] .............................................. H04L 12/26
(52) U.S. Cl. ...................................... 370/232; 455/434
(58) Field of Search ............................... 370/230, 232, 370/447, 462; 455/434; 709/229

(56) References Cited

U.S. PATENT DOCUMENTS

| | | | |
|---|---|---|---|
| 4,984,264 A * | 1/1991 | Katsube ...................... 379/197 |
| 5,357,507 A * | 10/1994 | Hughes et al. .............. 370/234 |
| 5,408,465 A | 4/1995 | Gusella et al. |
| 5,740,537 A * | 4/1998 | Beming et al. ............. 455/450 |
| 5,828,672 A | 10/1998 | Labonte et al. |
| 5,838,671 A * | 11/1998 | Ishikawa et al. ............ 370/335 |
| 5,991,272 A * | 11/1999 | Key et al. .................... 370/252 |
| 6,044,072 A * | 3/2000 | Ueda ............................ 370/335 |
| 6,212,163 B1 * | 4/2001 | Aida ........................... 370/230 |
| 6,216,006 B1 * | 4/2001 | Scholefield et al. ........ 455/422 |
| 6,226,277 B1 * | 5/2001 | Chuah ......................... 370/328 |
| 6,278,701 B1 * | 8/2001 | Ayyagari et al. ............ 370/310 |
| 6,377,548 B1 * | 4/2002 | Chuah ......................... 370/233 |

FOREIGN PATENT DOCUMENTS

| | | | |
|---|---|---|---|
| EP | 0889663 | 12/1997 | ............ H04Q 7/38 |
| EP | 0913968 | 10/1998 | ........... H04L 12/28 |
| JP | 11111828 | 4/1999 | ............ H04Q 7/38 |

OTHER PUBLICATIONS

Jain Error characteristics of FDDI. IEEE transactions on communications vol. 38 no 8, Aug. 1990, pp 1244-1252.*
Yong Jin Kim, Jang Kyung Kim and Young Hee Lee, A New Medium Access Control Scheme for Wireless ATM Networks; Protocol Engineering Center, Electronics and Telecommunications Research Institutes; pp 295-299.

* cited by examiner

*Primary Examiner*—Hassan Kizou
*Assistant Examiner*—Dmitry Levitan

(57) ABSTRACT

An improved call admission control method and apparatus is provided in which a MAC (or equivalent) layer parameter such as the FER (frame error rate) is used as a basis for call admission control. An estimate of a FER which would result should a requested session be admitted is made, and on the basis of this estimate, the session is either admitted or denied access. The estimate is made by combining a previous FER with a degradation which is expected should the session be admitted. The degradation is either determined experimentally, or can be updated in real time to reflect actual traffic patterns.

13 Claims, 5 Drawing Sheets

CALL ADMISSION CONTROL METHOD AND APPARATUS FOR CELLULAR SYSTEMS

FIELD OF THE INVENTION

The invention relates to call admission control methods and apparatuses for cellular systems.

BACKGROUND OF THE INVENTION

In cellular systems, each time a new session attempts to access the system, a decision as to whether or not to admit the session must be made. Methods for achieving this one commonly referred to as call admission control methods. Most conventional call admission control methods make this decision based upon system resources such as frequency usage. Others employ the use of metrics such as power control, signal-to-noise ratio, and a required quality of service of multiple services for example. Generally speaking, these methods have not been designed to deal with modern cellular systems in which many multimedia subscribers compete to access the air interface with different types of services which require specific qualities of services.

Furthermore, conventional techniques do not predict what will happen if a particular session is admitted, but rather continue to admit sessions until quality drops to an unacceptable level for all the sessions. For example, when the average base station transmit power is used as a basis for admitting sessions, sessions are admitted until the transmit power is too high and quality goes down.

When there are multiple types of sessions, existing parameters are not all influenced by these sessions in a predictable manner. Furthermore, existing parameters are not necessarily usable in the MAC (media access control) layer, but rather might be usable at the physical layer for example.

SUMMARY OF THE INVENTION

It is an object of the invention to obviate or mitigate one or more of the above identified disadvantages.

The invention provides new methods and apparatuses for performing call admission control. In one broad aspect, a method is provided for performing call admission control upon receipt of a request for a new session in which a FER (frame error rate) estimate is made of a new system FER which will result should the new session be admitted, and a decision as to whether or not to admit the new session is made on the basis of the new FER estimate.

Preferably, the new system FER estimate is made by making an estimate of a previous system FER at the time of the request, determining an estimate of a degradation in the system FER should the new session be admitted, and combining the estimate of the degradation with the estimate of the previous system FER to obtain the estimate of the total system FER. Making the estimate of a previous system FER at the time of the request might consist of making an actual measurement of the system FER. Alternatively, it might consist of starting with the previous system FER equal to an initial system FER, and each time a session is admitted, adding the degradation estimated for the session to the previous system FER. Each time a session is ended, the degradation estimated for the session is subtracted from the previous system FER.

Preferably, the expected degradation in the system FER is maintained as a function of how many sessions have been admitted, and preferably also as a function of the type of the sessions which have been admitted.

The expected degradations are preferably determined by generating test traffic with a predetermined ratio between numbers of sessions of each type and by then adding new sessions to the test traffic and making a measurement of the degradation in FER, and using these measurements as the expected degradations.

In another embodiment, a feedback mechanism can be used to provide more accurate and timely estimates of the expected degradations. In this embodiment, an initial value for the degradation in FER for the Nth session of each type is determined, for example by using the above identified experimental technique. At some point after an Nth session of a particular type is admitted, for example just as an N+1th session of the particular type is admitted, a measurement of the degradation which resulted from the Nth session is made and stored. The expected degradation for the Nth session is then determined to be an average of up to K stored measurements and the initial value for the Nth session if there are fewer than K stored measurements, where K is an integer greater than or equal to two.

Preferably, the decision as to whether or not to admit the new session on the basis of the new FER estimate is made by comparing the new FER estimate to a target FER, and if the new FER exceeds the target FER deciding to deny the session, while if the new FER does not exceed the target FER deciding to admit the session.

A MAC layer implementation device operable to implement any of the above discussed methods is provided in another embodiment. In further embodiments, a base station and a base station controller operable to implement any of the above discussed methods are provided.

In each of the above embodiments the MAC layer parameter used to perform call admission control has been the frame error rate. In an alternative embodiment, another MAC layer (or equivalent layer) parameter is selected which is affected by all different session types in a manner which makes it suitable for use as a basis of call admission control and is used in a similar predictive manner.

In another embodiment, a call admission control apparatus is provided which has input circuitry operable to receive a request for a new session, and processing circuitry operable to make a FER estimate of a new system FER which will result should the new session be admitted and to decide whether to admit or to deny the new session on the basis of the new FER estimate.

Advantageously, the FER is a parameter that is a direct indication of the cell interference, is influenced by all traffic types, takes frame re-transmission into account and is a tangible measurement which can be used in the MAC layer (or equivalent layer) for call admission control purposes. These traits make the FER a valuable criterion for call admission control in third generation cellular systems where many subscribers compete to access the system bandwidth with multiple applications (traffic types) which require different qualities of service.

Another embodiment of the invention provides an article of manufacture having a computer usable medium having computer readable code means embodied therein for performing call admission control, the computer readable code means in said article of manufacture having computer readable code means for making an estimate of a new system FER which will result should a new session be admitted, computer readable code means for deciding to admit or to deny the new session on the basis of the new system FER estimate.

Preferably, the computer readable medium further comprises computer readable code means for making an estimate of a previous system FER at a time of the request, computer readable code means for determining an estimate of a degradation in the system FER should the new session be admitted; and computer readable code means for combining the estimate of the degradation to the estimate of the previous system FER to obtain said estimate of the total system FER.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
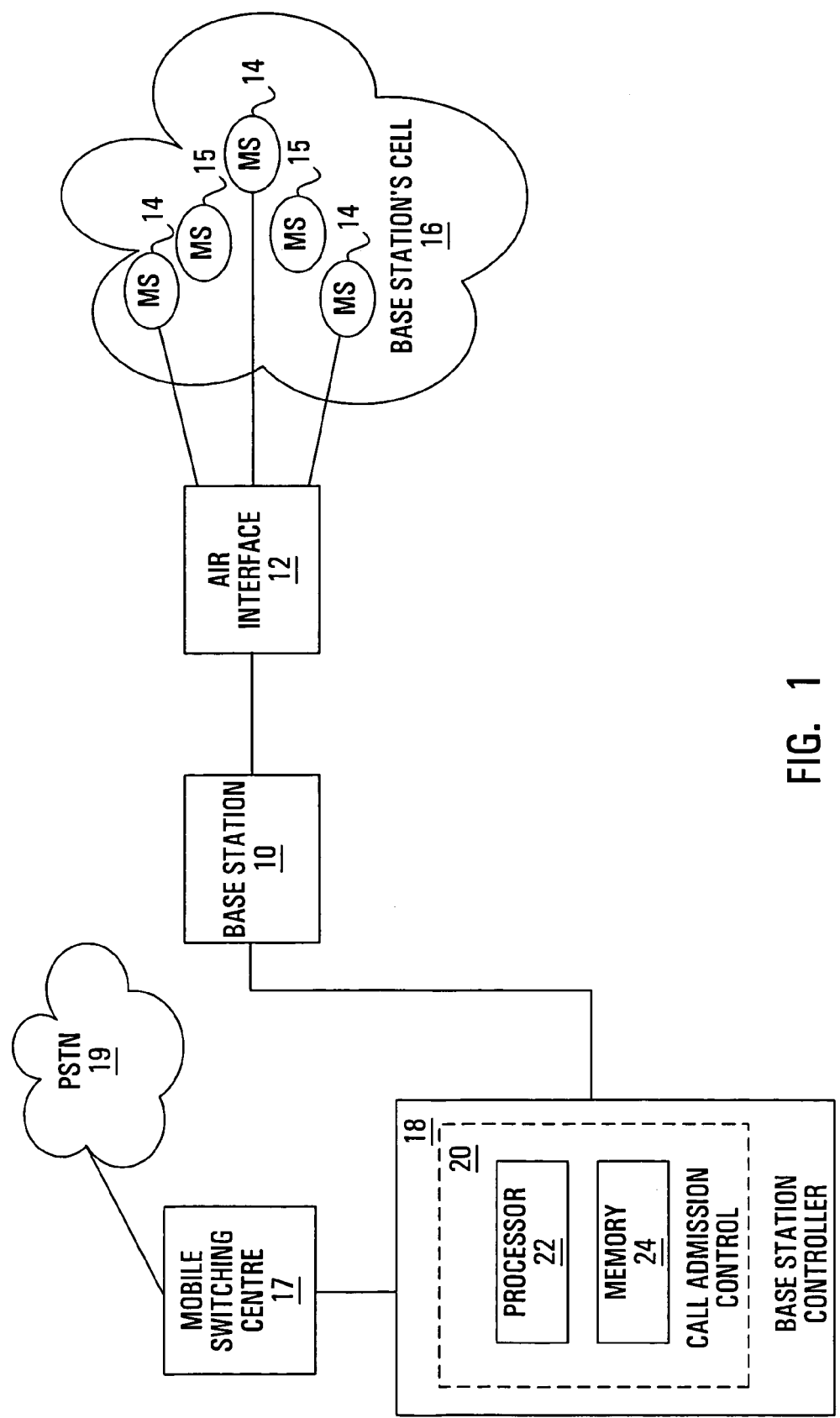
FIG. 1 is a block diagram of a cellular system featuring a call admission control system and method according to an embodiment of the invention.

Referring first to FIG. 1, shown is a block diagram of a cellular system within which the call admission control methods and apparatuses provided by embodiments of the invention may be applied. A base station 10 is shown connected through an air interface 12 to a number of mobile stations (MS) 14 (three shown) in the base station's cell 16, or area of service provision. Also shown are two mobile stations 15 located within the base station's cell 16 which do not currently have a connection to the base station 10. The base station 10 is also connected to a base station controller 18 which is in turn connected to a mobile switching centre 17 having a connection to a PSTN (public switched telephone network) 19. When a mobile station 15 requests to have a session admitted, it sends some sort of origination message to the base station 10. When the request originates at a mobile station, the session is said to be "mobile originated". In the case of an externally originated request (mobile terminated session) the mobile station is paged, and the mobile station's response to the page is treated as the request for a new session. In any case there is an identification of the type of the session. Different session types might include voice, packet-switched data, circuit-switched data, or simultaneous and in-session permutations of the above categories in different grades. The session type might identify further characteristics such as the required bandwidth, and the required quality of service for example. Access to the air interface resources is provided at the MAC layer, and thus decisions as to whether or not to admit a new session are implemented wherever the MAC layer is implemented. This might be in the base station 10, but alternatively may be in an external component such as the base station controller 18 or the mobile switching centre 17. The call admission control methods and apparatuses provided by embodiments of the invention are preferably implemented wherever the MAC layer (or equivalent functionality) is implemented. In the illustrated example, block 20 labelled "call admission control" performs call admission control, and is assumed to form part of the base station controller 18. The call admission control block 20 has a processor 22 and memory 24. It is to be understood that dedicated processor and memory for call admission control need not necessarily be provided, but rather other components in the base station controller (or other MAC layer device) can be adapted to handle the required functionality, as discussed in detail below. More generally still, any processing element could be used, including suitably programmed FPGAs, ASICs, or other hardware and/or software.

Figures 2A, 2B:
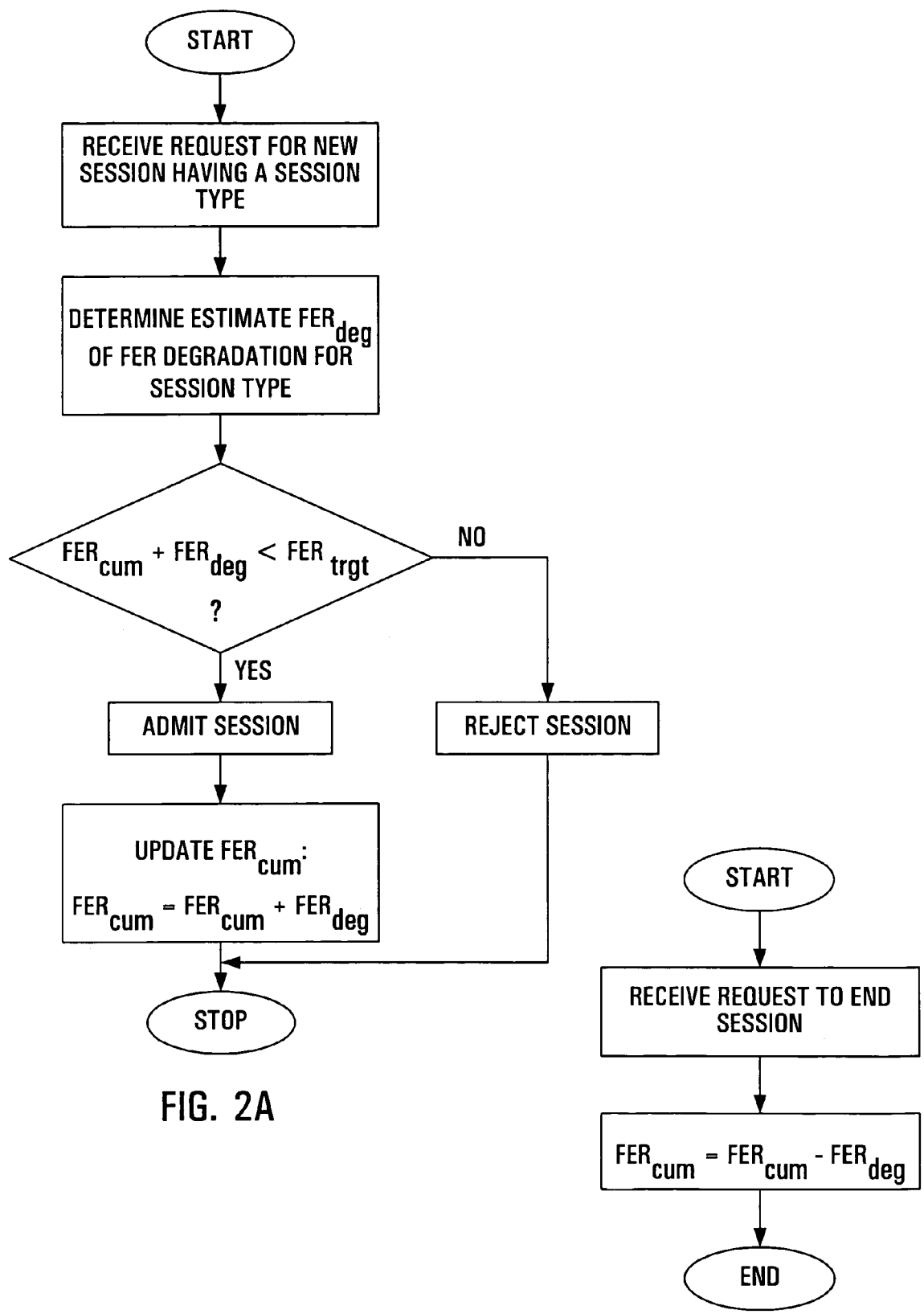
FIGS. 2A and 2B are flowcharts for a first call admission control method according to an embodiment of the invention.

Referring now to FIG. 2A, a flowchart for a method of performing call admission control according to a first embodiment of the invention is illustrated. To begin, several terms will be defined:

$FER_{cum}$ is a cumulative estimate of the current FER for all sessions which are currently in progress;

$FER_{deg}$ is an estimate of a FER degradation which will result should a new session be admitted; and $FER_{trgt}$ is a system design parameter which sets a target FER for use in call admission control as detailed below.

A frame error occurs whenever a frame is received from a mobile station which has errors which cannot be corrected. There are well established methods of determining frame error rates, and these will not be discussed in further detail here.

With continued reference to both FIGS. 1 and 2A, the first step is for the system to receive some sort of conventional or otherwise request for a new session from one of the mobile stations 15 (mobile originated) or a request for a session to a mobile station 15 from a source other than the particular mobile station 15, received by the mobile switching centre 17 from the PSTN 19 for example (mobile terminated). In either case, a message will be received from the mobile station 15, typically by the base station 10 serving the cell in which a mobile station 15 making the request is located. If the MAC layer is not implemented in the base station 10, the base station 10 will forward the request to the appropriate MAC layer device, the base station controller 18 in this case which in turn passes the request to the call admission control block 20. From the mobile originated request, mobile terminated request and/or the mobile station's response to a mobile terminated request it is possible to identify the requested session type.

On the basis of the session type, an estimate of the expected FER degradation, $FER_{deg}$, is determined, this being an estimate of the FER degradation which will result should the session be admitted.

Next, a sum of the expected FER degradation, $FER_{deg}$, plus the previous cumulative FER, $FER_{cum}$, is compared to the target FER, $FER_{trgt}$. If this sum is less than the target FER, then the session is admitted, and $FER_{cum}$ is updated by adding to it the projected FER degradation, $FER_{deg}$. If the sum is greater than the target FER, then the session is rejected.

FIG. 2B is a flowchart for what occurs when a session is ended. To begin, some sort of conventional or otherwise indication that the session is to end is received. Next, the FER degradation associated with the session which is to end is subtracted from the cumulative FER, $FER_{cum}$. The amount subtracted is a function of how many sessions are present when the session ends.

Figure 3:
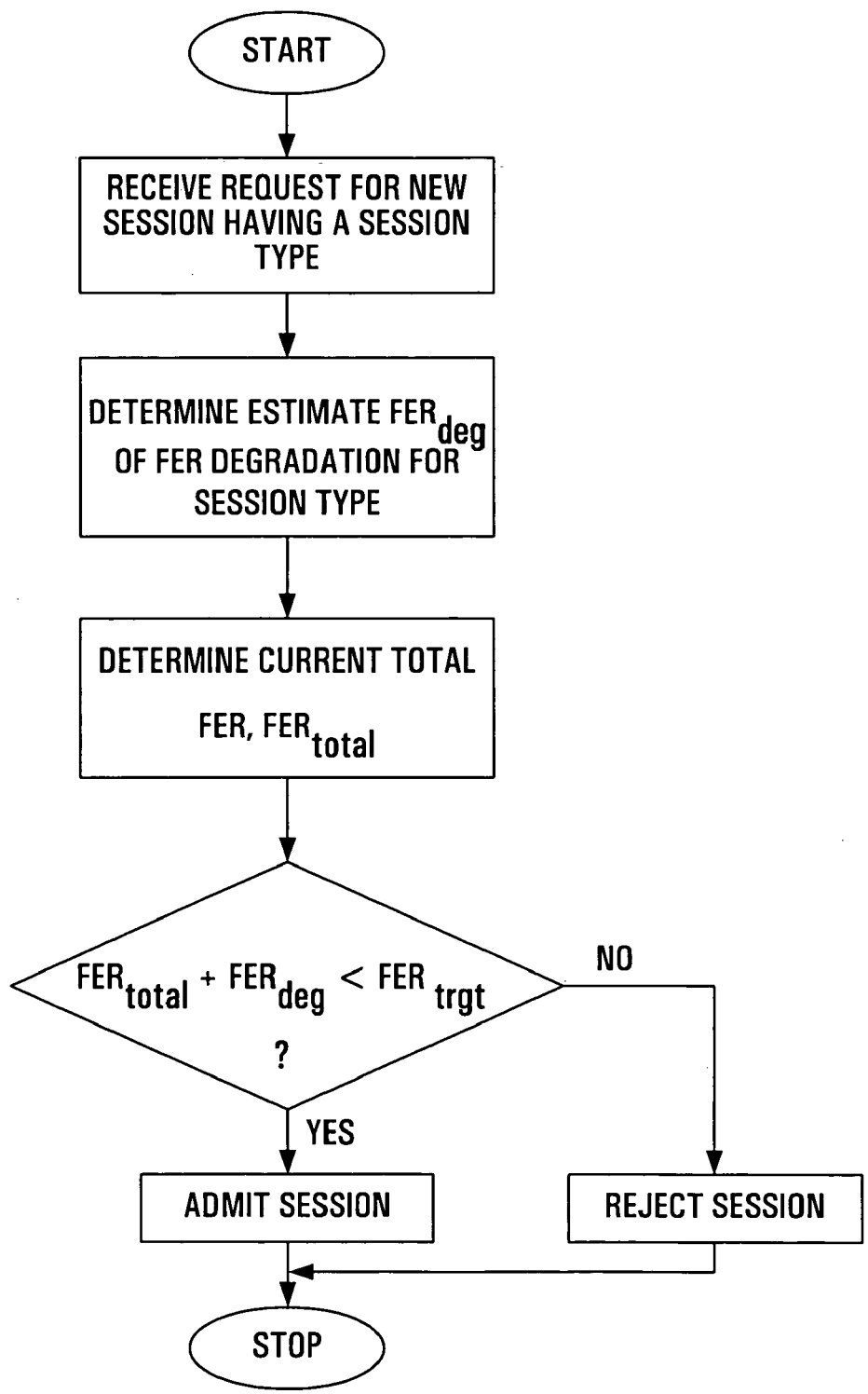
FIG. 3 is a flowchart for a second call admission control method according to an embodiment of the invention.

Referring now to FIG. 3, a flowchart for a method of performing call admission control according to a second embodiment of the invention is illustrated. As before, to begin, several terms will be defined:

$FER_{total}$ is a measurement of the current FER for all sessions which are currently in progress;

$FER_{deg}$ is an estimate of a FER degradation which will result should a new session be admitted; and $FER_{trgt}$ is a system design parameter which sets a target FER for the system.

The first step is for the system to receive some sort of request for a new session from which it is possible to identify a session type.

On the basis of the session type, an estimate of the expected FER degradation, $FER_{deg}$, is determined, this being an estimate of the FER degradation which will result should the session be admitted.

Next, the current system FER, $FER_{total}$, is either measured or estimated or otherwise determined. Preferably, $FER_{total}$ is maintained continuously independently of the call admission control process. Preferably, the current system FER is maintained by counting the number of frames in error during a sliding two second window. The $FER_{total}$ can be converted to a fraction by dividing the number of frames in error by the total number of frames during the period. More generally, the system FER may be calculated every n seconds where n represents a window length during which a fraction of frames are received in error. The time window should be long enough to have sufficient sample points in that instant of simulation for a meaningful $FER_{total}$ measure.

Next, a sum of the projected FER degradation, $FER_{deg}$, plus the total FER, $FER_{total}$, is compared to the target FER, $FER_{trgt}$. If this sum is less than the target FER, then the session is admitted. There is no need to update $FER_{total}$, as this is done independently. If the sum is greater than the target FER, then the session is rejected. Similarly, there is no need to update $FER_{total}$ when a session ends as this will occur independently.

There are many ways of determining $FER_{deg}$. Preferably, $FER_{deg}$ is not set as a constant for a given type of session, but rather is maintained as a function of how many sessions of that type are currently in progress. $FER_{deg}$ can be determined experimentally by assuming a typical traffic distribution, for example 80% voice and 20% packet-switched data and generating traffic with this distribution. To determine the degradation due to the introduction of an Nth voice session, a test traffic distribution with N-1 voice sessions and the required proportional number of data sessions is generated and the FER is measured. The number of sessions in the test traffic is maintained in proportion to the typical traffic distribution. Then the Nth voice session is generated and the new FER is measured after it has a chance to stabilize. The difference between these two FERs is $FER_{deg}$ for the Nth voice session. This needs to be repeated for different values of N, and for each type of session so as to generate a table of values $FER_{deg}$(type_name, N) which is the experimentally determined expected degradation due to the introduction of the Nth session of type type_name. Then, in the above call admission control methods, a count of the number of active sessions of each type is maintained, and this count is used to determine the correct value $FER_{deg}$(type_name, N) to use.

An even more accurate experimental measure of $FER_{deg}$ could be made by measuring $FER_{deg}$(type, N1, N2, ... Nj) where N1, N2, ... Nj are the numbers of sessions of type 1, 2 ..., j respectively, type 1, 2, ..., j being arbitrary session types.

More preferably, the terms $FER_{deg}$ (type_name, N) are calculated continuously in real time as a function of the traffic which is presently in the system by employing a feedback mechanism. An input to this approach is an initial value for $FER_{deg}$(type_name, N) for different numbers of sessions of different types, and these initial values are preferably the previously discussed experimentally determined degradations. The first consecutive sessions of a particular type are admitted based on the initial values as before. Next, around the time session number N+1 of the particular type is admitted to the system, an actual degradation due to the Nth session is measured and stored. The degradation is determined by measuring a difference between the FER just before the Nth session was admitted and the FER around the time (for example just before or just after) of the N+1th session entry. For the preferred embodiment, the FER degradation for the Nth session entry is determined at a time arbitrarily selected to be when the N+1th session is admitted. More generally, the FER degradation could be measured anytime after the Nth session entry and before an N+1th session entry, or before an N+1th session entry could have had any non-trivial effect on the FER. When a new Nth session attempts entry, the average of up to the previous K measured degradations (including the initial degradation if there have been fewer than K entries) is computed and used as the projected degradation in either of the call admission control processes discussed previously with reference to FIGS. 1 and 2. K might be chosen as five for example. Advantageously, averaging the degradations reduces the impact of anomalous values (zeros and FER "spikes" for example) while at the same time allowing the degradation associated with a particular number of sessions to change as conditions in the system change. It can be seen that not necessarily all Nth session admission will result in a degradation measurement which is included in the average.

Figure 4:
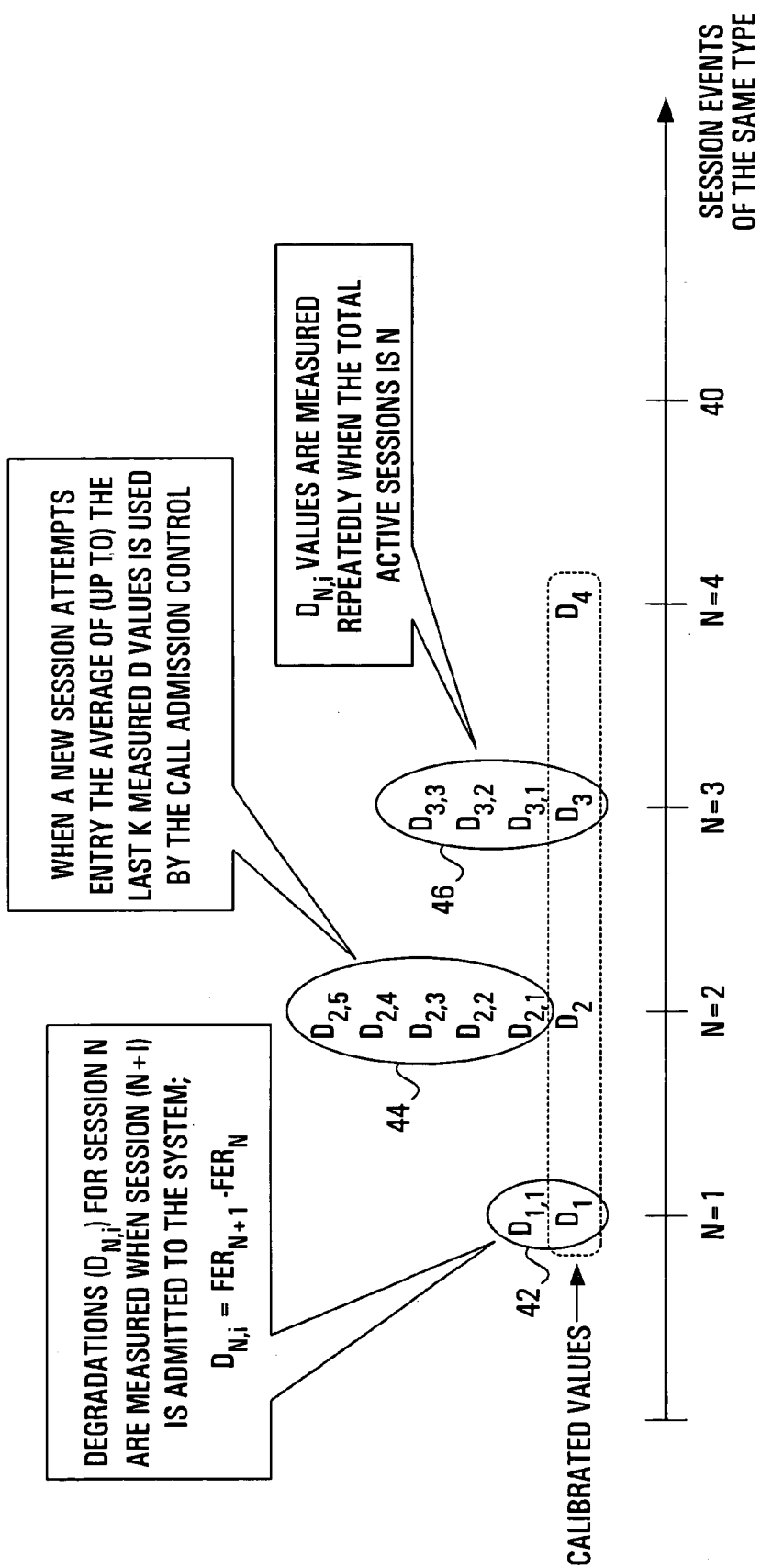
FIG. 4 is an illustration of degradation values calculated in real time.

This can be understood more clearly by referring to FIG. 4 which illustrates how degradations are maintained for a particular session type. Along the horizontal axis 40 is a count of the number N of admissions of sessions of the particular type. The initial values are indicated as $D_1$, $D_2$, $D_3$, and in general $D_N$. The measured degradations for new session entries are indicated by $D_{N, i}$ for the ith measured degradation due to an Nth session entry, preferably taken when an N+1th session is admitted. Thus, for example, $D_{1, 1}$ is the measured degradation due to the first entry of a first session. In the illustrated example, there is a single measured degradation for N=1 (taken upon the entry of a second session in the preferred embodiment), five measured degradations for N=2 (taken upon the entry of five third sessions in the preferred embodiment), three measured degradations for N=3 (taken upon the entry of three fourth sessions in the preferred embodiment) and so on. It is assumed for this example that up to the previous five degradations are used in determining $FER_{deg}$(type_name, N). The bubbles 42, 44, 46 indicate the degradations used in determining $FER_{deg}$ (type_name, N) for each value of N. For N=1, $FER_{deg}$ (type_name, 1) is calculated to be the average of the initial value $D_1$ and the first measured value $D_{1, 1}$ as indicated by bubble 42. For N=2, $FER_{deg}$(type_name, 2) is calculated to be the average of the five measured values $D_{2, 1}$, $D_{2, 2}$, $D_{2, 3}$, $D_{2, 4}$, and $D_{2, 5}$, as indicated by bubble 44. For N=3, $FER_{deg}$(type_name, 3) is calculated to be the average of the initial value $D_3$ and three measured values $D_{3, 1}$, $D_{3, 2}$, and $D_{3, 3}$, as indicated by bubble 46. This same process is executed to compute $FER_{deg}$ for different types and for different values of N.

Figure 5:
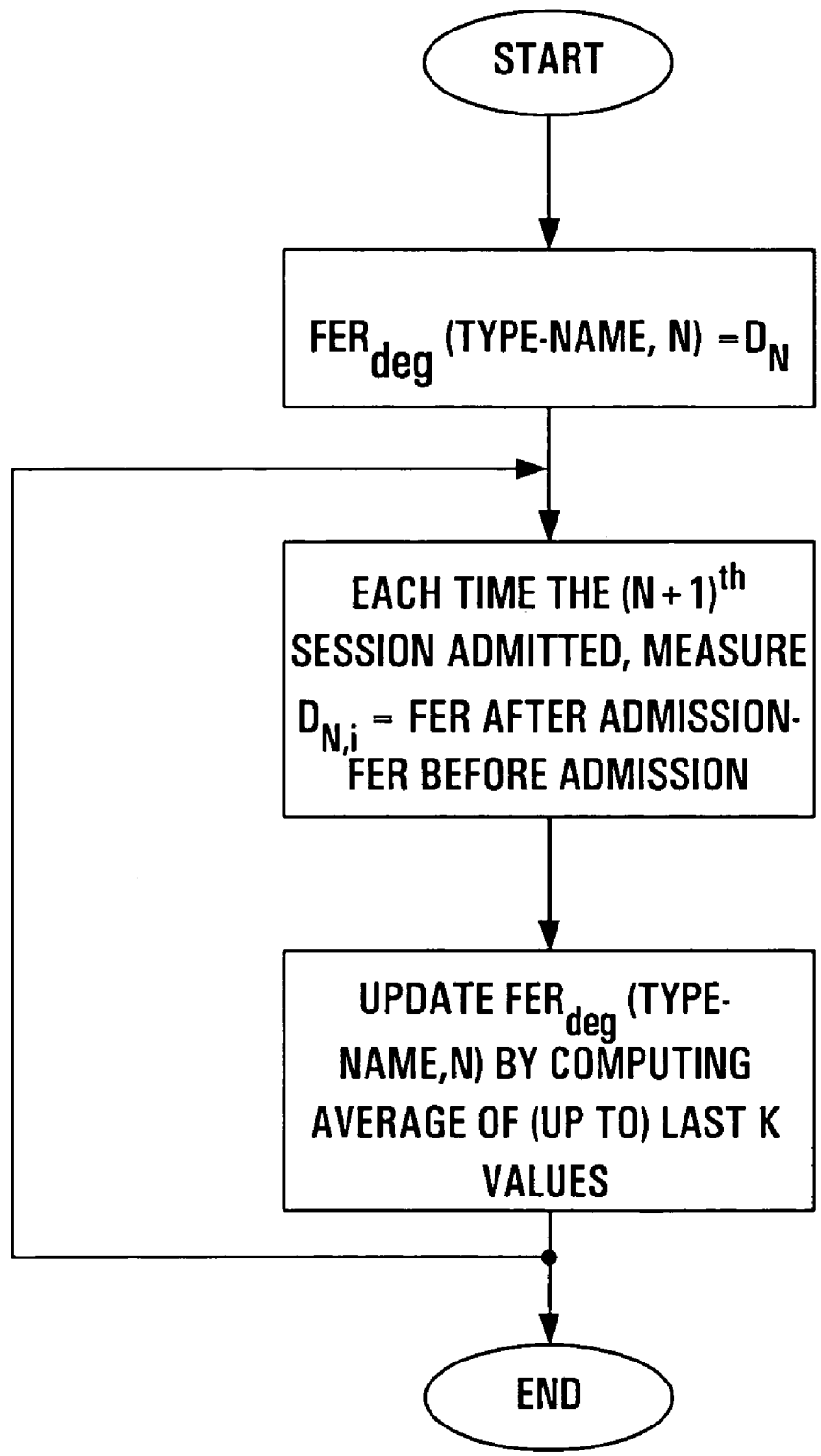
FIG. 5 is a flowchart for the calculation of degradation values for use in the call admission control method of FIG. 3 using the values shown in FIG. 4.

A flowchart for the maintenance of the degradation $FER_{deg}$(type_name, N) values for use by the call admission control apparatus and method is shown in FIG. 5. To begin, the $FER_{deg}$(type_name, N) values are initialized by setting them all to the initial values $D_N$. The next two steps are executed each time a session is admitted (more generally after a suitable time has passed). The ith time an N+1th session is admitted, $D_{N,i}$ is measured according to FER at that time minus the FER just after admission of the Nth session. A rotating buffer with K spots may be provided for each value of N in which to store the measured degradations. Next, the value $FER_{deg}$(type_name, N) is updated by computing an average of up to the last K values.

It is noted that the measurement of the FER degradation is an approximation only since the change in FER may not all be directly attributable to the introduction of the session. Furthermore, negative FER degradation values are preferably adjusted to zero as a session should not be allowed to have a positive influence on the FER.

The above methods can be applied whenever a request for the air interface resources of a given MAC layer implementation device are requested. For example, a base station or a base station controller operable to implement these methods may be provided. This request might come from a mobile station in the cell area of a base station, or might come from an external user (for example on the public switched telephone network) who wishes to communicate with a mobile station in the cell area of the base station.

Numerous modifications and variations of the present invention are possible in light of the above teachings. It is therefore to be understood that within the scope of the appended claims, the invention may be practised otherwise than as specifically described herein.

For example, while FER has been the parameter used to admit sessions, in alternative embodiments, other parameters may be used, provided they are measurable or accessible at the MAC (or equivalent layer) and are affected proportionately by all types of calls and provided they can be used predictively.

Another embodiment of the invention provides an article of manufacture having a computer usable medium having computer readable code means embodied therein for performing call admission control, the computer readable code means in said article of manufacture having computer readable code means for making an estimate of a new system FER which will result should a new session be admitted, computer readable code means for deciding to admit or to deny the new session on the basis of the new system FER estimate.

Preferably, the computer readable medium further comprises computer readable code means for making an estimate of a previous system FER at a time of the request, computer readable code means for determining an estimate of a degradation in the system FER should the new session be admitted; and computer readable code means for combining the estimate of the degradation to the estimate of the previous system FER to obtain said estimate of the total system FER.

What is claimed is:

1. A method of performing call admission control upon receipt of a request for a new session comprising:
   making an estimate of a new system FER which will result should the new session be admitted; and
   deciding to admit or to deny the new session on the basis of the new system FER estimate;
   wherein making the estimate of the new system FER comprises:
   making an estimate of a previous system FER at the time of the request;
   determining an estimate of a degradation in the system FER should the new session be admitted; and
   combining the estimate of the degradation to the estimate of the previous system FER to obtain said estimate of the total system FER.

2. A method according to claim 1 wherein making an estimate of a previous system FER at the time of the request comprises measuring the system FER.

3. A method according to claim 1 wherein making an estimate of a previous system FER at the lime of the request comprises:
   starting with the previous system FER equal to an initial system FER;
   each time a session is admitted, adding the degradation estimated for the session to the previous system FER; and
   each time a session is ended, subtracting a degradation reduction for the session from the previous system FER.

4. A method according to claim 1 further comprising:
   maintaining an expected degradation in the system FER as a function of how many sessions have been admitted;
   wherein determining an estimate of a degradation in the system FER should the new session be admitted comprises:
   maintaining a current count of how many sessions have been admitted; and
   setting the estimate of the degradation in the system FER equal to the expected degradation for the current count.

5. A method according to claim 1 wherein the request for a new session identifies the session as having one of at least two different types, the method further comprising:
   maintaining an expected degradation in the system FER as a function of bow many sessions of each of said different types have been admitted;
   wherein determining an estimate of the degradation in the system FER should the new session be admitted comprises:
   maintaining a current count of how many sessions of each type have been admitted; and
   setting the estimate of the degradation in the system FER equal to the expected degradation for the session's type and the type's current count.

6. A method according to claim 5 wherein maintaining an expected degradation in the system FER as a function of how many sessions of each of said different types have been admitted comprises:
   generating test traffic with a predetermined ratio between numbers of sessions of each type; and
   adding new sessions to the test traffic and making a measurement of the degradation in FER, and using these measurements as the expected degradations.

7. A method according to claim 5 further comprising:
   identifying an initial value for the degradation in FER for the Nth session of each type;
   each time an N+1th session of a particular type is admitted, making a measurement of the degradation which results; and
   determining the expected degradation for the Nth session to be an average of up to K measurements for N+1th session admissions and the initial value for the Nth session if there are fewer than K measurements, where K is an integer greater than or equal to two.

8. A method according to claim 7 wherein identifying an initial value comprises:
   generating test traffic with a predetermined ratio between numbers of sessions of each type; and adding new sessions to the test traffic and making a measurement of the degradation in FER, and using these measurements as the initial values.

9. A method according to claim 1 wherein admitting or denying the new session on the basis of the new FER estimate comprises:
comparing the new FER estimate to a target FER, and if the new FER estimate exceeds the target FER denying the session, and if the new FER estimate does not exceed the target FER admitting the session.

10. A method according to claim 1 further comprising:
identifying an initial value for the degradation in FER for an Nth session admission;
making measurements of the degradation which results due to Nth session admissions; and
determining the expected degradation for the Nth session to be an average of up to K measurements for Nth session admissions and the initial value for the Nth session if there are fewer than K measurements, where K is an integer greater than or equal to two.

11. A method according to claim 10 wherein one of said measurements of the degradation which results due to Nth session admissions is taken around the time an N+1th session admission occurs.

12. A method according to claim 10 wherein one of said measurements of the degradation which results due to Nth session admissions is taken before an N+1th session admission occurs and after the Nth session has been active for long enough for a meaningful measurement to be taken.

13. An article of manufacture comprising:
a computer usable medium having computer readable code means embodied therein for performing call admission control, the computer readable code means in said article of manufacture comprising:
computer readable code means for making an estimate of a new system FER which will result should a new session be admitted; and
computer readable code means for deciding to admit or to deny the new session on the basis of the new system FER estimate;
computer readable code means for making an estimate of a previous system FER at a time of the request;
computer readable code means for determining an estimate of a degradation in the system FER should the new session be admitted; and
computer readable code means for combining the estimate of the degradation to the estimate of the previous system FER to obtain said estimate of the total system FER.

* * * * *